Dec. 17, 1935.　　　　　L. T. VOGT　　　　　2,024,554
APPARATUS FOR VULCANIZING TIRES AND OTHER ARTICLES
Filed Dec. 19, 1933
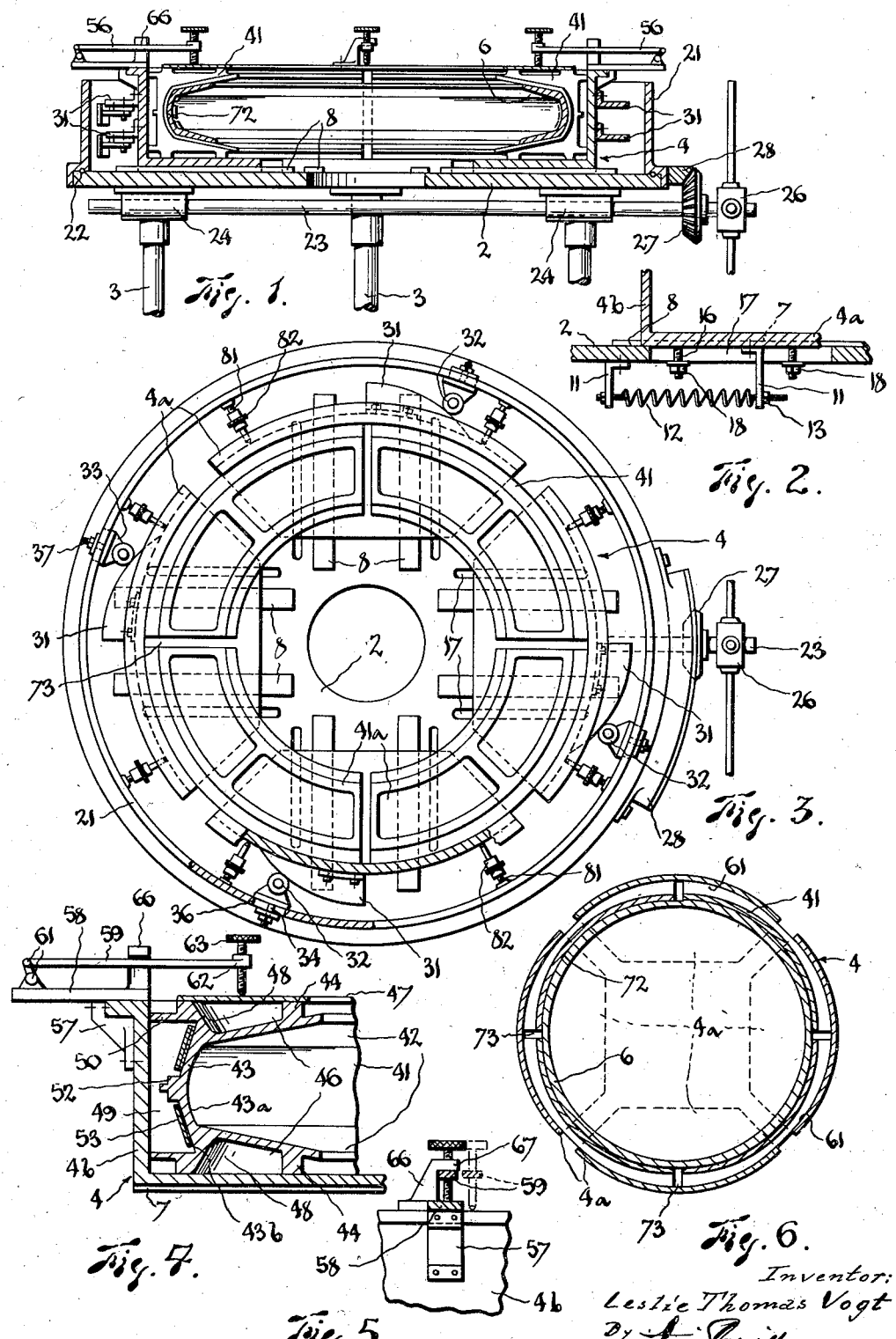

Patented Dec. 17, 1935

2,024,554

UNITED STATES PATENT OFFICE 2,024,554

APPARATUS FOR VULCANIZING TIRES AND OTHER ARTICLES

Leslie Thomas Vogt, Coburg, Victoria, Australia

Application December 19, 1933, Serial No. 703,107
In Australia January 3, 1933

16 Claims. (Cl. 18—18)

This invention relates to apparatus for vulcanizing rubber articles and refers more particularly to the "full circle" type of apparatus for vulcanizing the entire tread of a pneumatic tire or the like in the one operation.

The primary object of the present invention is to provide an improved "full circle" apparatus for vulcanizing pneumatic tires and other articles, which apparatus includes relatively simple and inexpensive means for either increasing or reducing the diameter of the vulcanizing mould, thereby enabling the improved apparatus to readily accommodate and vulcanize pneumatic tires, for example, of various sizes.

A characteristic feature of the invention resides in the provision of an annular supporting member or mould divided radially into a plurality of sections, and means for simultaneously imparting radial movement to said sections to thereby increase or reduce the diameter of said supporting member for the reception of different sized matrices.

Another feature of the invention resides in an electrically heated blanket adapted to accommodate various sized matrices, said blanket being divided radially into a plurality of sections which are detachably mounted upon the adjustable supporting member.

Various other objects and features of the invention will be more readily apparent from the following description which refers by way of example to one suitable embodiment of the invention.

Referring to the drawing which forms part of this specification—

Figure 1 is a transverse section of a "full circle" vulcanizing apparatus in accordance with one embodiment of the present invention.

Figure 2 is an enlarged fragmentary sectional view showing spring means associated with the various sections of an annular supporting member.

Figure 3 is a plan view of Figure 1, parts being broken away or omitted for convenience of illustration.

Figure 4 is a fragmentary cross-section on an enlarged scale showing a heating blanket adapted to accommodate a matrix; adjustable clamping means for holding said blanket in position being also indicated.

Figure 5 is a fragmentary cross-section of the clamping means seen in Figure 4.

Figure 6 is a diagrammatic sectional plan showing the assembly of the sectional supporting member, the heating blanket and the matrix accommodated within said blanket.

The improved vulcanizing apparatus includes a suitable base plate or table 2 which may be provided with a plurality of legs 3. Mounted upon the upper surface of said table is an adjustable supporting member or mould 4 for a matrix 6 hereinafter described, said supporting member being annular in plan and divided radially into a plurality of sections 4a. Each section may be substantially L shaped in cross section, one or more slots 7 being formed in the base portion of each section to slidably accommodate guide rails or the like 8 upon the table.

Spring means may be associated with each section 4a of the supporting member to normally urge each section radially in an outward direction. As seen in Figure 2 of the drawing, the spring means associated with each said section may include one or more pairs of brackets 11 secured to the table 2 and the section of the supporting member respectively. A spring 12 extends between the brackets of each pair and if desired a nut and bolt adjusting device 13 may be associated with each spring to vary the strength thereof.

Each section 4a of the supporting member or mould is preferably provided with anchoring means for preventing upward movement of said section in relation to the table 2 and for this purpose each section may be provided with one or more bolts or studs 16 depending through slots 17 formed in the table and provided with enlarged heads or nuts 18 at their lower ends to slidably engage the bottom of the table and oppose any tendency of the supporting member to rise in relation to the table.

In combination with the foregoing, the invention includes adjusting means for simultaneously imparting radial movement to the various sections 4a of the supporting member or mould for the purpose of either increasing or reducing the diameter thereof. Said adjusting means may include an upstanding ring member 21 carried by the table 2 and extending around said supporting member, said ring being preferably provided with ball bearings 22 whereby it may be partially rotated upon said table as hereinafter described. Movement of said ring may be effected by means of gearing or the like such as a spindle 23 mounted in bearings 24 beneath said table and provided with a hand wheel or the like 26, said spindle carrying a pinion or bevel wheel 27 which meshes with a rack 28 carried by said ring.

Each section of the supporting member 4 is provided with one or more ramp or cam members 31 adapted to co-operate with rollers or the like 32 carried by the aforesaid ring 21. Each cam member 31 may be pivotally connected at one end to its section of the supporting member and provided at its opposite end with an adjusting screw or the like (not shown) whereby the inclination of said cam member may be increased or reduced to vary the radial movement of said section in accordance with requirements. Stops or shoulders carried by said section may be provided at either side of each said cam member 31 to prevent undesired sideward movement thereof.

If desired, each said roller 32 may be carried by a bracket 33 having a bolt 34 passing through an elongated slot 36 in the ring member 21 and a nut 37 on said bolt whereby the bracket and its roller may be adjusted longitudinally of the slot and clamped in the desired position, relative to its ramp member. Radial movement of the various sections of the supporting member may thus be varied by adjusting the relative positions of the rollers as aforesaid.

The improved apparatus also includes means for heating the matrix 6, and according to one suitable embodiment said heating means comprises an electrically heated blanket 41 of the type described in my prior Australian patent specification No. 4,655 of 1931. In this instance, the formation of the heating blanket which is preferably composed of aluminium or the like is somewhat modified. Said blanket is divided radially into a plurality of sections 41a which are adapted to be accommodated upon the adjustable supporting member. When in an operative position, the joints or gaps between the ends of adjacent blanket sections are preferably staggered in relation to the joints or gaps between the sections of the supporting member in order to increase the stability of the assembly.

As seen more clearly in Figure 4 of the drawing, each said blanket sections 41a is of substantially U shape in cross-section, and includes upper or lower or side walls 42 which may be inclined or converge towards a vertical or end wall 43 extending between said side walls. The latter may be provided with a plurality of laterally spaced ribs 44 extending longitudinally of each blanket section and forming air chambers 46 therebetween. The ribs on the lower wall rest upon the supporting member 4 whilst the ribs on the upper wall may receive a holding down plate 47 as hereinafter described. The outer rib on each side wall 42 is preferably provided with an inclined inner face 48 adjacent to the air chambers 46.

The end wall 43 is preferably provided with a pair of outstanding fins 50 extending longitudinally of each blanket section, said fins being spaced apart and adapted to engage the upstanding portion 4b of the supporting member. An air chamber 49 is also formed between these fins. The end wall 43 is provided with an inner face 43a adapted to engage the adjacent face of the matrix 6 and two outer faces 43b which are located between the fins 48 and inclined sidewardly so as to diverge from an intermediate ridge 52 as seen in Figure 4.

Electric heating elements 53 are mounted upon the inclined face 43b, the elements on the various blanket sections being wired in circuit in any suitable manner and thermostatically controlled if so desired.

A set of removable matrices 6 of various sizes is provided, each matrix being of unbroken ring-like form and adapted to fit snugly within the sections of the heating blanket. The matrices are preferably composed of aluminium or like metal.

Any suitable means such as a sand bag, rope coil or an inflatable air bag may be inserted in the tire or other article being vulcanized in order to hold it in position on the aforesaid matrix.

Associated with the aforesaid holding down plate 47 is suitable retaining means adapted to adjustably press down upon the plate and thus prevent any tendency of the blanket sections to rise or otherwise be displaced. The said retaining means may include a plurality of circumferentially spaced clamping devices 56 each of which may comprise a bracket 57 secured to the upstanding portion 4b of the supporting member and provided with a sideward extension 58 to which a swinging arm 59 is pivotally connected at one end as at 61. Said arm is provided at its opposite end with a screwed boss 62 carrying a clamping screw 63 adapted to contact with the top of the holding down plate 47. Associated with the arm 59 is a stop or abutment 66 having an overhanging lip 67 adapted to detachably engage the arm 59 at an intermediate point in the length thereof and thus oppose upward movement of the arm when the screw contacts with the aforesaid plate. The arm 59 is capable of being moved sidewardly as indicated in broken lines in Figure 5 of the drawing so that it may clear the lip 67 and be swung upwardly and rearwardly about its pivotal connection 61 when so desired.

When the supporting member or mould is adjusted to its smallest or an intermediate diameter for example, the inner surfaces of the upstanding portions 4b of the various sections thereof coincide with the curvature of a perfect circle; but when the supporting member is adjusted to increase or reduce its diameter the combined curvature of the various sections forms a somewhat deformed circle.

Similarly when the various sections of the heating blanket occupy a certain position the inner curvatures of the several sections 41a also coincide with the curvature of a perfect circle. If desired, more than one heating blanket 41 may be provided for each vulcanizing apparatus in which case the outer surface of each blanket section is curved as indicated at 61 in Figure 6 of the drawing to coincide with and snugly engage the inner surfaces of the adjacent sections of the supporting member.

It is also essential for each ring-like matrix 6 to snugly engage the inner surfaces of the various sections of the heating blanket in order that the matrix may be uniformly heated throughout its length. Therefore, when the diameter of the heating blanket 41 has been increased beyond the size of its perfect circle, the outer surface of the larger sized matrices is curved longitudinally as indicated at 72 to agree with the curvature of the inner surface of the heating blanket.

When the diameter of the heating blanket is increased to accommodate a larger sized matrix, relatively small gaps 73 are formed between the ends of adjacent blanket sections. The presence of these gaps does not, however, interfere with the heating of the matrix as the heat is rapidly conducted across the relatively small portions of the matrix which bridge the said gaps.

It has been found that a heating blanket as aforesaid may be adjusted to accommodate matrices of five or six different sizes before the gaps between the ends of adjacent blanket sections becomes too wide for efficient heating. It is then advisable to employ a larger sized heating blanket.

By arranging the heating elements on the blankets as aforesaid, the heat is concentrated near the tread portion of a tire or the like in the matrix whilst the side walls of the tire are subjected to a slightly lower temperature. It is believed that the inclined faces 48 on the aforesaid outer ribs 44 function to radiate the heat along the side walls of the heating blanket. The air within the various air chambers 46 and 49 is also heated and serves to maintain the temperature of the matrix substantially constant during the vulcanizing operations.

In use, the apparatus may be readily adjusted to the required size by simply turning the hand wheel 26 which partially rotates the ring member 21 and moves each roller 32 relatively to its associated ramp member 31, thus simultaneously moving the various sections 4a of the supporting member or mould and the heating blanket 41 in either an inward or outward direction according to the direction of rotation of the ring member. The appropriate matrix is then placed in position within the heating blanket and the supporting member contracted to lock the matrix in position.

In order to relieve the co-operating ramp members and rollers 31 and 32 respectively of the stress of holding the various sections of the supporting member in position, the ring member 21 may be provided with a plurality of outstanding screwed rods 81 each carrying a sleeve 82 with a pointed end, said sleeve being provided with a hand grip so that it may be turned and moved longitudinally of said rods thus bringing its pointed end into contact with the upstanding portion 4b of the aforesaid supporting member. Two of such bearing devices may be provided for each section of the supporting member as seen in Figure 3 of the drawing.

If desired, make-up pieces may be fitted within the aforesaid gaps in the heating blanket or the capacity of the heating elements may be increased at the ends of adjacent sections of the heating blanket so that the heat may be readily diffused through those portions of the matrix adjacent to said gaps.

Although the invention has been described by way of example as embodying an electrical heating blanket as aforesaid for the matrix it is to be understood that it is not limited thereto and that any other suitable form of heating means may be employed if so desired.

It should be understood that various modifications, alterations and/or additions may be incorporated in the foregoing without departing from the spirit and scope of the invention as defined by the appended claims.

Having now described my invention what I claim as new and desire to secure by Letters Patent is—

1. Improved vulcanizing apparatus of the "full circle" type comprising in combination a base plate or table, a sectional supporting member or mould mounted upon said table and adapted to receive the article to be vulcanized, means for varying the diameter of said mould and a set of different sized matrices, each of which is adapted to be detachably accommodated within said mould after the latter has been adjusted to the required size for the purpose specified.

2. Apparatus according to claim 1, in which the matrices are annular and have an outer circumferential surface of different curvature than that of the inner surface thereof for the purpose specified.

3. Apparatus according to claim 1, in which said mould or supporting member comprises a plurality of sections mounted upon a base plate or table which is provided with means for guiding said sections and in which the mould or supporting member is radially adjustable for the purpose specified.

4. Apparatus according to claim 1, including in combination anchoring means for preventing upward movement of each section of the mould or supporting member in relation to a base plate or table without interfering with the sliding movements of the various sections during the adjusting operation.

5. Improved vulcanizing apparatus comprising an electrically heated blanket or casing adapted to detachably accommodate a matrix of the article to be vulcanized, said blanket being substantially U shaped in cross section and having an end wall provided with two outer faces which carry electric heating elements and are inclined sidewardly so as to diverge from an intermediate point in the width of said blanket for the purpose specified.

6. Apparatus according to claim 5, in which said blanket or casing is of annular form and is provided with a plurality of laterally spaced ribs on its opposite side walls, said ribs extending longitudinally thereof and forming air chambers therebetween, the outer rib on each said wall being provided with an inclined inner face substantially as and for the purpose specified.

7. Apparatus according to claim 5, in which said heating blanket or casing is of annular form and is circumferentially divided into a plurality of sections adapted for mounting upon an adjustable supporting member whereby the diameter of the blanket or casing may be either increased or reduced for the purpose specified.

8. Apparatus according to claim 5, including in combination adjustable retaining means adapted to press upon the heating blanket or casing and thus obviate any tendency of the blanket or sections thereof to rise or otherwise be displaced.

9. Apparatus according to claim 5, including in combination adjustable retaining means adapted to press upon the heating blanket or casing, said retaining means comprising a plurality of circumferentially spaced clamping devices each of which includes a bracket, a swinging arm pivotally connected at one end to said bracket and carrying a clamping screw at its opposite end, and a stop or abutment having an overhanging lip provided on said bracket to engage said arm at an intermediate point in the length thereof for the purpose specified.

10. An improved vulcanizing apparatus of the "full circle" type comprising in combination a base plate or table, an annular supporting member divided radially into a plurality of sections which are adjustably mounted upon said table, means for simultaneously effecting radial movement of said sections, an electrically heated blanket or casing carried by said supporting member, said blanket being of substantially U shape in cross section and divided radially into a plurality of sections, and a set of removable matrices of different sizes each of which is adapted to be accommodated within said heating blanket for the purpose specified.

11. Improved vulcanizing apparatus of the "full circle" type, comprising in combination a table, an outer mold which consists of a plurality of circumferentially divided sections mounted on said table and adapted to receive the article to be vulcanized, means for simultaneously effecting radial movement of said mold sections whereby the diameter of said mold may be either increased or reduced, a displaceable member on the table, said means including cooperating cams and rollers carried by sections of the supporting member or mold and by said displaceable member, and means for moving said displaceable member in relation to said mold sections whereby each roller is moved longitudinally of its associated cam.

12. Improved vulcanizing apparatus of the "full circle" type, comprising in combination a table, an outer mold which consists of a plurality of circumferentially divided sections mounted on said table and adapted to receive the article to be vulcanized, means for simultaneously effecting radial movement of said mold sections whereby the diameter of said mold may be either increased or reduced, an upstanding ring member encircling said mold, said means including co-operating cams and rollers carried by said mold sections and by said upstanding ring member, and mechanism operatively connected to said ring member for partially rotating same in either direction.

13. Improved vulcanizing apparatus of the "full circle" type, comprising in combination a table, an outer mold which consists of a plurality of circumferentially divided sections mounted on said table and adapted to receive the article to be vulcanized, means for simultaneously effecting radial movement of said mold sections whereby the diameter of said mold may be either increased or reduced, an upstanding ring member encircling said mold, said means including cooperating cams and rollers carried by said mold sections and by said upstanding ring member, a rack carried by said ring member, a driving shaft, and a pinion on said shaft engaging said rack whereby said ring member may be partially rotated in either direction.

14. Improved vulcanizing apparatus of the "full circle" type, comprising in combination a table, an outer mold which consists of a plurality of circumferentially divided sections mounted on said table and adapted to receive the article to be vulcanized, means for simultaneously effecting radial movement of said mold sections whereby the diameter of said mold may be either increased or reduced, a displaceable member on said table, said means including co-operating cams and rollers carried by the sections of the supporting member or mold and by said displaceable member, each said roller being mounted upon a bracket which is adjustable lengthwise in relation to its associated cam, and means for moving said displaceable member in relation to said mold sections whereby each roller is moved longitudinally of its associated cam.

15. Improved vulcanizing apparatus of the "full circle" type, comprising in combination a mold supporting member which is divided circumferentially into a plurality of sections, an outer mold carried by said supporting member and adapted to accommodate the outer peripheral portion of the article to be vulcanized, said mold being circumferentially divided into a plurality of sections, means for simultaneously effecting radial movement of the sections of said mold-supporting member whereby the diameter of said mold may be either increased or reduced, and springs for influencing each mold section in such a manner that each section is urged in a radial direction against the action of the moving means.

16. An improved vulcanizing apparatus of the "full circle" type, comprising in combination a base plate or table, an annular supporting member divided radially into a plurality of sections which are adjustably mounted upon said table, means for simultaneously effecting radial movement of said sections, an electrically heated blanket or casing carried by said supporting member, said blanket being of substantially U shape in cross-section and divided radially into a plurality of sections, and a matrix removably mounted within said heating blanket, said supporting sections and heating blanket sections being movable to accommodate matrices of different sizes.

LESLIE THOMAS VOGT.